(12) United States Patent
Miller et al.

(10) Patent No.: US 6,247,058 B1
(45) Date of Patent: Jun. 12, 2001

(54) METHOD AND APPARATUS FOR PROCESSING NETWORK PACKETS USING TIME STAMPS

(75) Inventors: John P. Miller, Rocklin; Erik E. Erlandson, Roseville, both of CA (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 09/050,645

(22) Filed: Mar. 30, 1998

(51) Int. Cl.$^7$ .................... G06F 15/16; G06F 15/173; H04L 12/56
(52) U.S. Cl. .................... 709/234; 709/235; 709/240; 370/418; 370/429; 710/53; 710/54; 702/187
(58) Field of Search .................... 709/234, 235, 709/240; 370/418, 429, 230; 710/53, 54; 702/187

(56) References Cited

U.S. PATENT DOCUMENTS

| | | | |
|---|---|---|---|
| 4,799,215 | * | 1/1989 | Suziki . |
| 5,390,299 | * | 2/1995 | Rege et al. ............... 709/234 |
| 5,402,417 | * | 3/1995 | Aramaki . |
| 5,781,549 | * | 7/1998 | Dai . |
| 5,926,458 | * | 7/1999 | Yin ............... 370/230 |
| 5,978,928 | * | 11/1999 | Rust ............... 702/187 |
| 5,991,812 | * | 11/1999 | Srinivasan ............... 709/234 |
| 6,011,775 | * | 1/2000 | Bonomi et al. ............... 370/230 |
| 6,026,074 | * | 2/2000 | Stadler et al. ............... 370/230 |

* cited by examiner

Primary Examiner—Mark H. Rinehart
Assistant Examiner—Paul Kang
(74) Attorney, Agent, or Firm—David A. Plettner

(57) ABSTRACT

A network device receives packets from a first network segment, time stamps the packets as they arrive, and transmits the packets to a second network segment. By time stamping packets as they arrive, stale packets can be identified and discarded. A stale packet is a packet that has been pending in the network device longer than an active timeout interval, which may be varied based on network traffic levels to conserve network bandwidth. Packets may also be discarded to conserve packet buffer memory in the network device. For example, when an incoming packet arrives and an output buffer in which the packet must be stored is full, the output buffer is scanned to identify and discard packets that have exceeded a minimum timeout interval, thereby allowing the incoming packet to be stored in the output buffer. Many network protocols initiate the retransmission of packets after a timeout interval has expired and an acknowledge packet has not been received. The present invention conserves network bandwidth by not transmitting stale packets that either will be ignored or redundant when network traffic becomes heavy. The present invention also conserves buffer memory by allowing broadcast and multicast packets to be stored in and transmitted from a single broadcast packet output buffer. The proper packet transmission order at each port is maintained by comparing the time stamp assigned to the broadcast packet when it arrived at the network device with the time stamps of the other packets in the output buffer. Finally, the present invention provides many opportunities for collecting statistics, such as the average latency, mean latency and standard deviation of the latency of packets processed by network device.

15 Claims, 10 Drawing Sheets

METHOD AND APPARATUS FOR PROCESSING NETWORK PACKETS USING TIME STAMPS

FIELD OF THE INVENTION

The present invention relates to communication between network nodes. More specifically, the present invention relates a network device that transmits data packets between network segments and time stamps arriving packets to support a variety of packet management functions.

DESCRIPTION OF THE RELATED ART

In the art of computer networking, protocol stacks are commonly used to transmit data between network nodes that are coupled by network media. Network nodes include devices such as computer workstations, servers, network printers, network scanners, and the like. To harmonize the development and implementation of protocol stacks, the International Standards Organization (ISO) promulgated an Open System Interconnection (OSI) Reference Model that prescribes seven layers of network protocols.

FIG. 1 is a block diagram 10 of the OSI Reference Model. The model includes a hardware layer 12, a data link layer 14, a network layer 16, a transport layer 18, a session layer 20, a presentation layer 22, and an application layer 24. Each layer is responsible for performing a particular task. Hardware layer 12 is responsible for handling both the mechanical and electrical details of the physical transmission of a bit stream. Data link layer 14 is responsible for handling the packets, including generating and decoding of the address used by the hardware protocol and any error detection and recovery that occurred in the physical layer. For example, in an Ethernet network data link layer 14 is responsible for generating and decoding the media access control (MAC) address. Network layer 16 is responsible for providing connections and routing packets in the communication network, including generating and decoding the address used by upper level protocols and maintaining routing information for proper response to changing loads. For example, in the TCP/IP protocol, network layer 16 is responsible for generating and decoding the IP address. Transport layer 18 is responsible for end-to-end connections between nodes in the network and the transfer of messages between the users, including partitioning messages into packets, maintaining packet order and delivery, flow control, and physical address generation. Session layer 20 is responsible for implementing the process-to-process protocols. Presentation layer 22 is responsible for resolving the differences in formats among the various sites in the network, including character conversions, and duplex (echoing). Finally, application layer 24 is responsible for interacting directly with the users. Layer 24 may include applications such as electronic mail, distributed data bases, web browsers, and the like.

Before the ISO promulgated the OSI Reference Model, the Defense Advanced Research Projects Agency (DARPA) promulgated the ARPNET Reference Model. The ARPNET reference model includes four layers, a network hardware layer, a network interface layer, a host-to-host layer, and a process/application layer.

As their names imply, the OSI and ARPNET Reference Models provide guidelines that designers of protocols may or may not choose to follow. However, most networking protocols define layers that at least loosely correspond to a reference model.

In the field of computing, there are many popular protocols used to transmit data between network nodes. For example, TCP/IP, AppleTalk®, NetBEUI, and IPX are all popular protocols that are used to transmit data between servers, workstations, printers, and other devices that are coupled to computer networks.

It is common for several protocols to operate concurrently within a single network node, even if the network node has a single network interface. For example, a typical computer workstation may use TCP/IP to communicate over the Internet, and IPX to communicate with a network server. Likewise, a printer may be configured to receive print jobs using either the AppleTalk® protocol or the NetBEUI protocol. Typically these protocols sit on top of lower level hardware protocols. For example, it is common for two computer systems coupled via an Ethernet network to communicate using the TCP/IP protocol. Generally, a software routine existing at data link layer 14 or network layer 16 routes data packets between the network adapter and the proper protocol stack.

Consider a TCP/IP packet transmitted over an Ethernet network. The Ethernet packet includes a 48-bit media access control (MAC) address that addresses another node on the Ethernet network. The entire Ethernet packet is protected by a cyclic redundancy check (CRC) code that is calculated and stuffed into the Ethernet packet by the sending network adapter, and is used by the receiving network adapter to verify the integrity of the Ethernet packet. If the integrity of the packet cannot be verified, the packet is discarded. Encapsulated within the Ethernet packet is the IP portion of the TCP/IP protocol, which is known in the art as a datagram. The datagram includes a 32-bit IP address and a 16 bit checksum code that protects the IP header. If the integrity of the IP header cannot be verified, the datagram is discarded. The TCP portion of the TCP/IP protocol is encapsulated within the datagram, and has a 16 bit checksum code that protects the TCP header and the contents of the TCP portion of the datagram. If the integrity of the TCP header or the contents of the TCP portion cannot be verified, the datagram is discarded and the sender will retransmit the packet after not receiving an acknowledge datagram from the intended recipient. Note that this packet contains two addresses, the Ethernet address and the IP address. The relationship between these two addresses will be described in greater detail below.

FIG. 2 is a diagram showing a prior art network 26. Network 26 interconnects network nodes 28, 30, 32, 34, 36, 38, 40, 42, and 44. As described above, the network nodes may be devices such as computer workstations, servers, network printers, network scanners, and the like. For the sake of this discussion, assume that the network nodes are equipped with Ethernet network adapters and transmit data using the TCP/IP protocol. Many networks conform to a series of standards promulgated by the Institute of Electrical and Electronics Engineers (IEEE). This series of standards is known in the art as the IEEE 802 family of standards. The IEEE 802 family of standards are hereby incorporated by reference.

The network nodes are coupled together into LAN segments via hubs. All nodes in a LAN segment are in a common collision domain because each node in a LAN segment receives a signal when another node attempts to transmit a packet, and if two nodes in a LAN segment attempt to transmit a packet at the same time, a collision occurs. The Ethernet protocol includes a retransmission algorithm that minimizes the likelihood that another collision will occur when the two nodes attempt to retransmit their respective packets. In FIG. 2, network nodes 28, 30, and 32 are coupled together into LAN segment 48 via hub 46. Likewise, network nodes 34, 36, and 38 are coupled together into LAN segment 52 via hub 50 and network nodes 40, 42, and 44 are coupled together into LAN segment 56 via hub 54.

Traditionally, a prior art hub was a network device that served as the central location for attaching wires from network nodes, such as workstations. Early prior art hubs were passive. There was no amplification of the network signals, and the hub simply coupled together the network wiring from the network nodes to form sets of common conductors that interconnected the nodes. On the other hand, repeaters provided amplification of signals between network nodes, thereby allowing a larger number of network nodes to be coupled together into LAN segments. More recently, hubs have begun to incorporate some of the functionality of switches (discussed in greater detail below) and repeaters. Modern hubs are capable of implementing multiple sub-networks such that two or more network nodes coupled to a hub can send and receive data simultaneously. In addition, modern hubs are capable of scrambling signals such that only the network node addressed by a packet receives an unscrambled version of the packet. However, in general modern hubs maintain the appearance, from the point of view of the network nodes, of a single set of conductors connecting all network nodes of the LAN segment. Hubs and repeaters typically exist within hardware layer 12 of OSI Reference Model 10 of FIG. 1.

Switches and bridges are used to interconnect local or remote LAN segments. Switches and bridges form a single logical network, and operate at data link layer 14 and hardware layer 12 of OSI Reference Model 10. In FIG. 2, switch 58 connects sub-networks 48 and 52. In the Ethernet protocol, packets are addressed by a media access control (MAC) address. Switches and bridges maintain lists of the MAC address of the network nodes of each LAN segment to which they are attached, and forward packets between LAN segments as appropriate.

While switches and bridges link together LAN segments to form subnets, routers are used to link together subnets via another network, such as the Internet or a wide area network (WAN). Routers may also be used to route packets within a common subnet. Routers maintain tables that associate higher level protocol addresses (such as an IP address) with ports of the router. In contrast to switches and bridges, routers are also capable of viewing the network as a hierarchical topology, wherein large blocks and ranges of address are routed to other routers for further routing. For this reason, routers are often used to route packets in very large networks, such as the Internet.

A default gateway is the router to which a node routes a packet when the node cannot determine that an outgoing packet is addressed to a node on the same subnet. A packet transmitted to a default gateway may be processed by several other routers before arriving at the destination node.

Consider that network node 40 seeks to send a TCP/IP packet to network node 28. Further assume that a substantial distance separates sub-networks 56 and 48. The packet is first transmitted to switch 60 and then to router 64, which is the default gateway used by node 40. Router 64 in turn transmits the packet to the Internet, which is represented by dotted line 70. Router 69 routes the packet to router 68 via backbone connection 72, which may include additional routers. Router 68 transmits the packet to router 62, which in turn routes the packet to switch 58. Switch 58 recognizes that the network node addressed by the packet exits in LAN segment 48 and forwards the packet to that LAN segment where network node 28 receives the packet.

One characteristic of most network transmission protocols is that delivery of the packet is assured by upper levels of the protocol. In the example above, the TCP layer of the protocol stack in network node 28 transmits an acknowledge packet after the packet is received. If the TCP layer of the protocol stack of node 40 does not receive the acknowledge packet before a timeout interval has expired, node 40 retransmits the packet and waits for another acknowledge packet. Other protocols define different acknowledgment schemes. For example, some protocols send a single acknowledge packet acknowledging reception of a group of packets.

Many factors can cause a packet to not be received. For example, assume that network traffic is heavy within LAN segment 48. The packet may have to wait at switch 58 until LAN segment 48 may receive the packet, and the delay in transmitting the packet may exceed the timeout interval of the TCP/IP protocol. In addition, if the buffers of switch 58 that store packets become full, received packets may have to be discarded.

An unfortunate consequence of requesting retransmission when packets timeout is that additional network bandwidth is required to transmit the same information when network traffic is heavy compared to when network traffic is light. Accordingly, many protocols will flood a network with additional packets at a time when the network is least able to handle additional traffic.

SUMMARY OF THE INVENTION

The present invention is a network device that receives packets from a first network segment, time stamps the packets as they arrive, and transmits the packets to a second network segment. The time stamps are used to support a variety of packet and memory management functions.

By time stamping packets as they arrive, stale packets can be identified and discarded. A stale packet is a packet that has been pending in the network device longer than an active timeout interval. The present invention allows the active timeout interval to be varied based on network congestion, thereby conserving network bandwidth, and conserves packet buffer memory by allowing incoming packets to be stored in a buffer if the buffer is full and packets have exceeded a minimum timeout interval. With respect to conserving packet buffer memory, when an incoming packet arrives and an output buffer in which the packet must be stored is full, the output buffer is scanned to identify packets exceeding the minimum timeout value. One or more of the oldest packets which are at least as old as the minimum timeout interval are discarded, thereby allowing the incoming packet to be stored in the output buffer. With respect to conserving network bandwidth, stale outbound packets that are otherwise eligible to be transmitted may be discarded if the age of the packet has exceeded the active timeout interval. A network device in accordance with the present invention may select a longer active timeout interval when network traffic is light and redundant retransmission will not cause a network to approach the upper limit of the network's bandwidth. When network traffic is heavy, the active timeout interval may be lowered toward the minimum timeout interval, thereby conserving network bandwidth. Many network protocols initiate the retransmission packets after a timeout interval has expired and an acknowledge packet has not been received. The present invention conserves network bandwidth by not transmitting stale packets that will either be ignored or will be redundantly retransmitted.

Another feature provided by the present invention is that broadcast and multicast packets can be stored in and transmitted from a single broadcast packet output buffer. In the prior art, broadcast and multicast packets were often copied to all the output buffers associated with the ports to which the packet was being transmitted. In accordance with the present invention, broadcast and multicast packets are stored in the broadcast packet output buffer and a much smaller broadcast packet tag is stored in the output buffer associated with each port. The time stamp assigned to the broadcast or multicast packet when it arrived at the network device is used to determine the transmission order at each port by comparing the broadcast or multicast packet time stamp with the time stamps of the other packets in the output buffer. Accordingly, the present invention enhances the efficient use of buffer memory.

Finally, the present invention provides many opportunities for collecting statistics, such as the average latency, mean latency and standard deviation of the latency of packets processed by network devices. Such statistics can be extremely helpful to a network administrator troubleshooting a network problem.

DETAILED DESCRIPTION OF THE PREFERRED EMBODIMENTS

Figure 1:
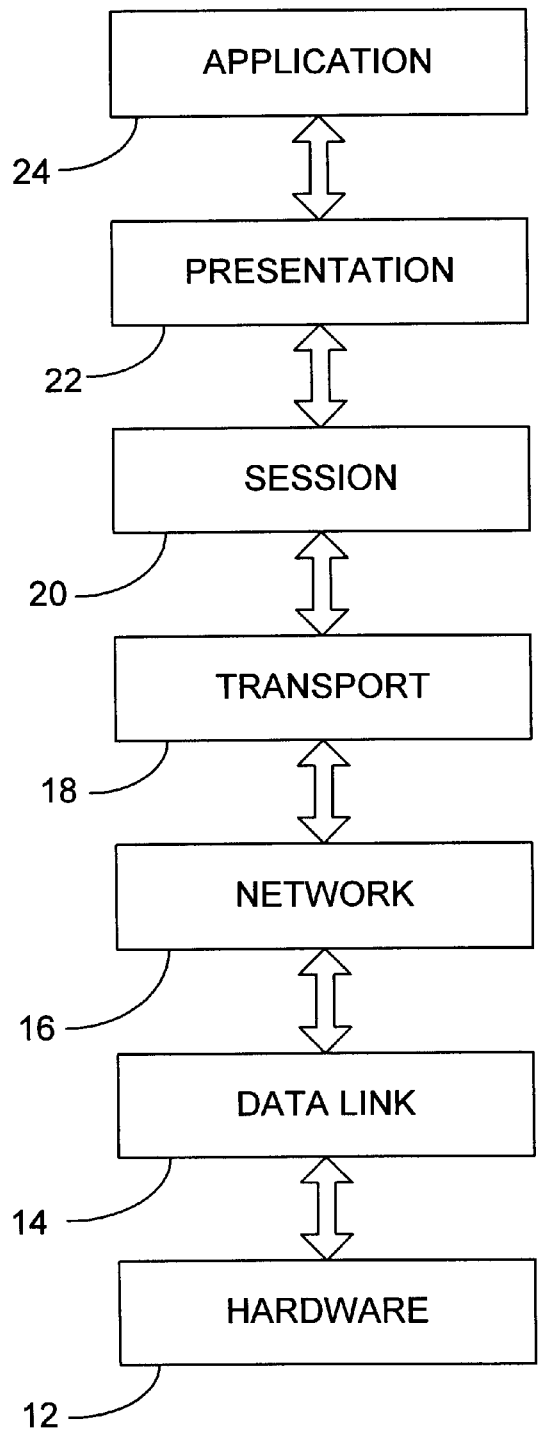
FIG. 1 is a block diagram of the Open System Interconnection (OSI) Reference Model.
Figure 2:
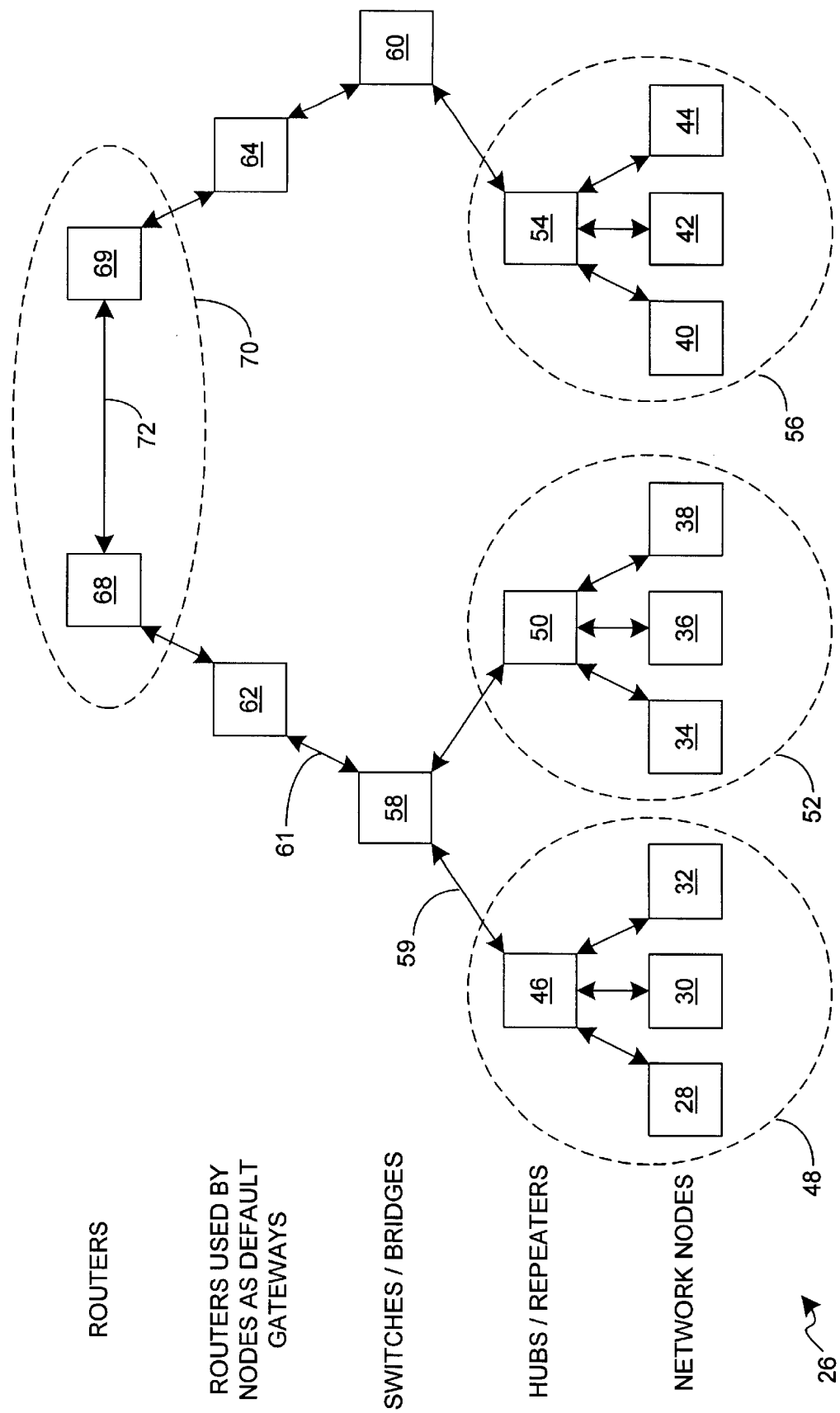
FIG. 2 is a diagram showing a prior art network.

The present invention is a network device, such as a switch, bridge, router, switching hub, and the like, that time stamps arriving packets to facilitate a variety of functions, such as dropping stale packets, processing broadcast packets, and collecting latency statistics. Before discussing the present invention in detail, consider prior art N port network device 74 shown in FIG. 3. Device 74 includes forwarding unit 76, and an output buffer for each port, such as output buffers 78, 80, 82, and 84. Device 74 represents any type of network device that receives a packet from a source network segment at one port, and forwards the packet to a destination network segment at another port, wherein the latency of the transmission time is dependent upon the ability of the destination segment to receive the packet. Device 74 may be a switch, bridge, router, switching hub, or any similar device. For example, in FIG. 2 switch 58 is such a device, wherein switch 58 can receive a packet via LAN segment 61, but cannot transmit the packet to LAN segment 48 while LAN segment 48 is being used to transmit another packet, or because the network protocol has requested that transmission stop.

Figure 3:
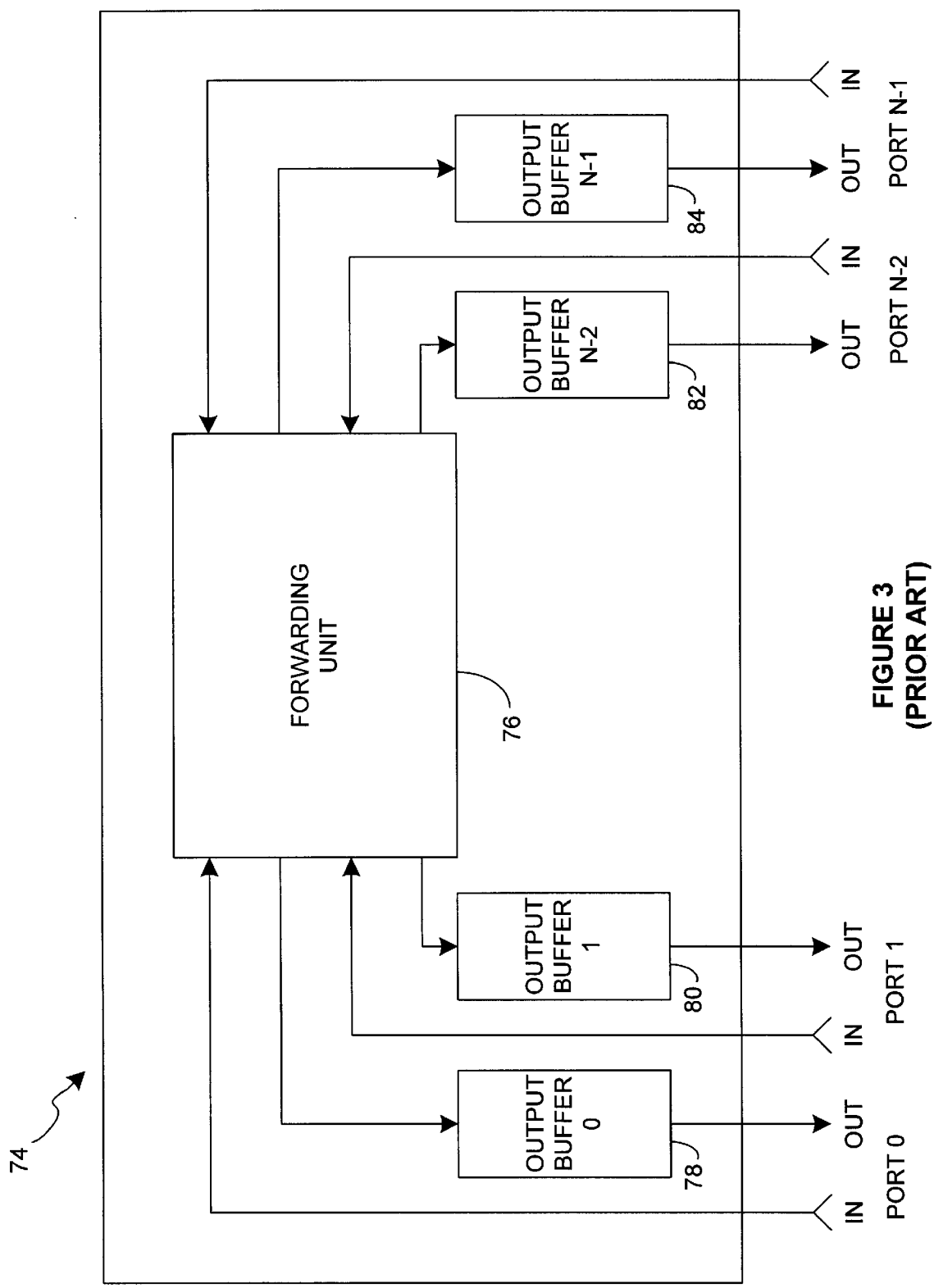
FIG. 3 is a block diagram of a prior art N port network device.

In FIG. 3, device 74 has N ports. Although each port is shown as having an input line and an output line, those skilled in the art will recognize that other configurations are possible. For example, in 10-Base-2 Ethernet networks connected via coaxial cable, the input and output lines are formed by common conductors.

When a packet is received at device 74, the packet is processed by forwarding unit 76. Forwarding unit 76 decodes the address of the packet and determines the port (or ports) to which the packet should be forwarded. Outgoing packets are placed in the output buffer of the port to which they are being forwarded. Many protocols define a format for broadcast packets, wherein a single packet is replicated and sent to all network nodes on a network. In the case of a broadcast packet, the outgoing packet is transmitted to the output buffers of all ports. The output buffers are simple first-in first-out (FIFO) buffers, with the oldest packet in each buffer being transmitted as soon as the network segment is able to accept the packet. When an output buffer is full, incoming packets are discarded.

The American National Standards Institute (ANSI) and Institute for Electrical and Electronics Engineers (IEEE) have promulgated ANSI/IEEE Standard 802.1D, which was incorporated above by reference along with the other members of the IEEE 802 family of standards. This standard relates to bridges and defines several relevant parameters:

2.3.6 Frame Lifetime. The service provided by the MAC Sublayer ensures that there is an upper bound to the transit delay experienced for a particular instance of communication. This maximum frame lifetime is necessary to ensure the correct operation of higher layer protocols. The additional transit delay introduced by a Bridge is discussed above.

To enforce the maximum frame lifetime a Bridge may be required to discard frames. Since the information provided by the MAC Sublayer to a Bridge does not include the transit delay already experienced by any particular frame, Bridges must discard frames to enforce a maximum delay in each Bridge.

The value of the maximum bridge transit delay is based on both the maximum delays imposed by all the Bridges in the Bridged Local Area Network and the desired maximum frame lifetime. A recommended and an absolute maximum value are specified in Table 4-2 [of the 802.1D Standard].

3.7.3 Queued Frames. The Forwarding Process provides storage for queued frames, awaiting an opportunity to submit these for transmission to the individual MAC Entities associated with each Bridge Port. The order of queued frames shall be maintained.

A frame queued by the Forwarding Process for transmission on a Port shall be removed from that queue on submission to the individual MAC Entity for that Port; no further attempt shall be made to transmit the frame on that Port even if the transmission is known to have failed.

A frame queued by the Forwarding Process for transmission on a Port can be removed from that queue, and not subsequently transmitted, if the time for which buffering is guaranteed has been exceeded for that frame.

A frame queued for transmission on a Port shall be removed from that queue, and not subsequently submitted to the individual MAC Entity for that Port, if that is necessary to ensure that the maximum bridge transit delay (2.3.6) will not be exceeded at the time at which the frame would be subsequently transmitted.

A frame queued for transmission on a Port shall be removed from that queue if the associated Port leaves the Forwarding state.

Removal of a frame from a queue for transmission on any particular Port does not of itself imply that it shall be removed from a queue for transmission on any other Port.

Table 4-2 of ANSI/IEEE Standard 802.1D indicates that the recommended value of the maximum bridge transit delay 1.0 seconds, while the absolute maximum value is 4.0 seconds.

Figure 4:
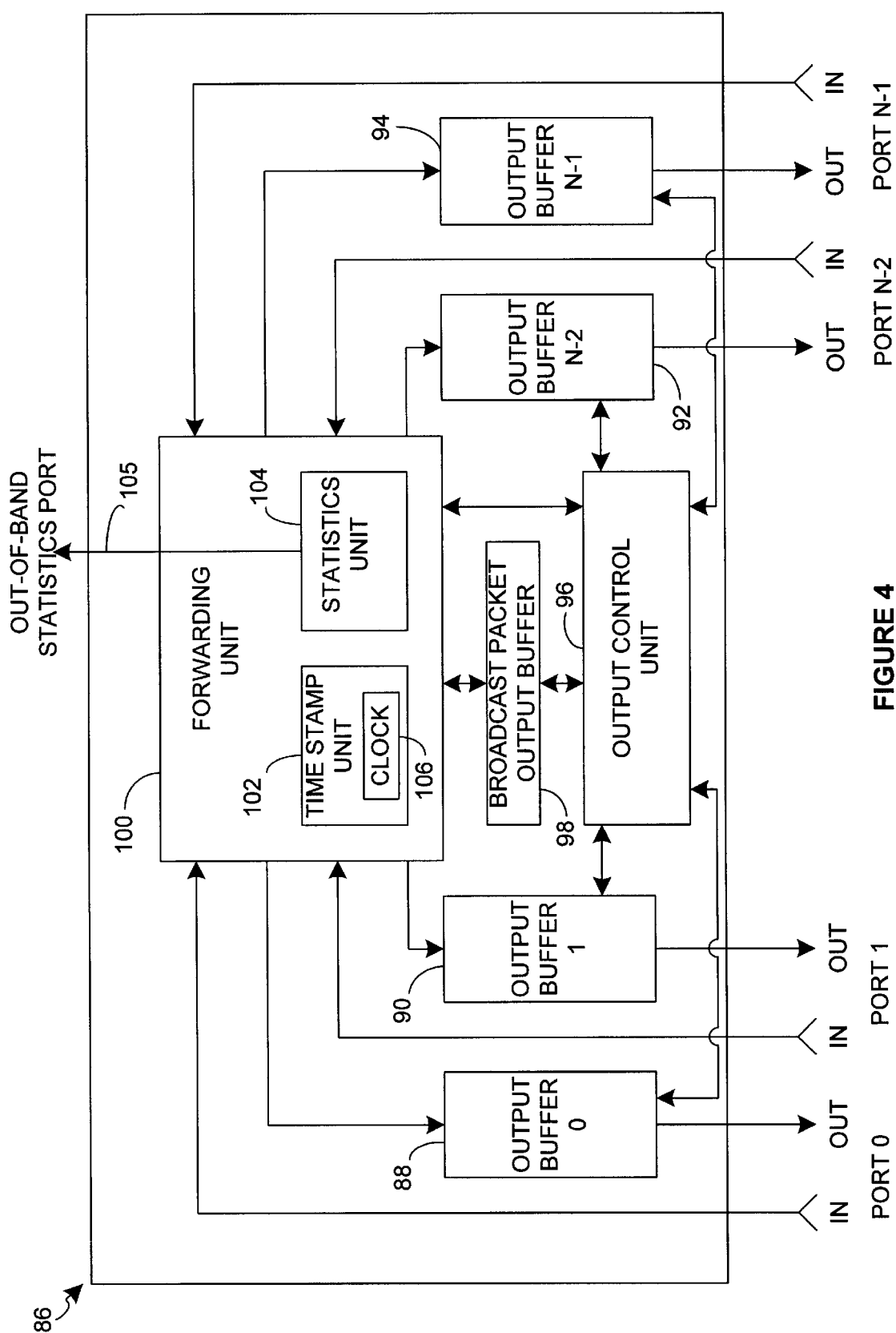
FIG. 4 is a block diagram of an N port network device in accordance with the present invention.

FIG. 4 is a block diagram of an N port network device 86 in accordance with the present invention. Device 86 includes an output buffer for each port (such as output buffers 88, 90, 92, and 94), an output control unit 96, a broadcast packet output buffer 98, and forwarding unit 100. Forwarding unit 100 includes statistics unit 104 and time stamp unit 102. Finally, time stamp unit 102 includes clock 106.

Incoming packets receive a time stamp as they arrive. The precision of clock 106, and the resulting time stamp, should be equal to or greater than the smallest time that is required to be measured, which preferably is the time required to receive a single data bit. In addition, clock 106 and the resulting time stamp should be able to represent at least the longest timeout interval required, and preferably the "up-time" of network device 86.

As packets arrive and are assigned a time stamp, forwarding unit 100 forwards the packets and associated time stamps to the appropriate output buffers. Output control unit 96 monitors contents of the output buffers, and transmits packets that have not exceeded an active timeout interval, with the oldest packets being transmitted first. Note that if device 86 is a bridge adhering to ANSI/IEEE Standard 802.1D, the active timeout interval shall not exceed 4.0 seconds. After a packet is transmitted, it is removed from the output buffer. The active timeout interval will be described in greater detail below. Note that although the output buffers are shown as separate buffers, those skilled in the art will recognize that individual output buffers may be dynamically defined in a common buffer memory by software routines. Accordingly, the size of an individual buffer that is carrying a heavy load of packets may be expanded, while the size of buffers carrying a lighter load may be reduced.

Another feature of the present invention is that broadcast and multicast packets are stored in a common broadcast buffer, thereby conserving buffer memory. When a broadcast or multicast packet is received, it is assigned a time stamp and stored in broadcast packet output buffer 98 along with a counter indicating the number of ports to which the packet is broadcast. As will be discussed below, a list of port IDs to which the broadcast or multicast packet may be may be used instead of a counter. In addition, a broadcast packet tag is placed in each of the output buffers along with the active timeout interval to be initially associated with the transmission of the broadcast or multicast packet at that port. When output control unit 96 examines an output buffer to determine which packet should be transmitted next, it considers the broadcast packet tag as another packet to be transmitted. If the broadcast or multicast packet represented by the tag is the oldest packet in the output buffer, the broadcast or multicast packet associated with the tag is retrieved from broadcast packet output buffer 98 and transmitted to the network segment attached to the port. The tag is then removed from the output buffer and the counter of the broadcast packet in buffer 98 is decremented. Alternatively, if a list of port IDs are used instead of a counter, the port ID at which the packet was transmitted is removed. If the counter indicates that the broadcast or multicast packet has been transmitted at all ports, then the broadcast or multicast packet is removed from broadcast packet output buffer 98.

As is known in the art, the term "broadcast" refers to transmission of a packet to all nodes on a network, and the term "multicast" refers to transmission of a packet to a subset of the nodes on a network. However, as used herein, the term "broadcast" will encompass the term "multicast" and generically refer to transmitting a packet to two or more nodes on a network.

Statistics unit 104 collects latency statistics based on the time stamps associated with packets. Unit 104 may be configured to collect a variety of statistics, such as the average latency, mean latency, and standard deviation of the latency of packets transmitted at each port. In addition, statistics unit 104 may be configured to adjust active timeout intervals for each port. For example, it may be desirable to enforce a longer active timeout interval if network traffic is high. Collected statistics are provided at out-of-band statistics port 105. Of course, the information provided by unit 104 may be provided via one of the ports using in-band transmission techniques, or using any other method known to those skilled in the art.

FIGS. 5–10 are flow charts illustrating the operation of network device 86 in FIG. 4. The following discussion assumes that each output buffer is capable of storing a pool of outbound packets and broadcast packet tags. Also stored in each buffer and associated with each packet and tag is a time stamp and an active timeout interval, thereby allowing an active timeout interval to be calculated for each outgoing packet at each port. The present invention defines two timeout intervals, an active timeout interval that determines whether a packet should be transmitted when the packet is ready to be transmitted and a minimum timeout interval that is used to determine if a packet should be discarded to make room for an arriving packet. Each broadcast packet tag includes a pointer that references an entry of broadcast packet output buffer 98. Buffer 98 stores a pool of outbound broadcast packets. Associated with each outbound broadcast packet is a counter indicating the number broadcast packet tags in the output buffers that reference the broadcast packet, or alternatively, a list of port IDs indicating the ports through which transmission of the broadcast packet will be attempted. Keep in mind that packets have variable lengths. For example, an Ethernet packet may comprise from 64 to 1518 bytes, and a broadcast packet tag is much smaller than the size of a packet.

Figure 5:
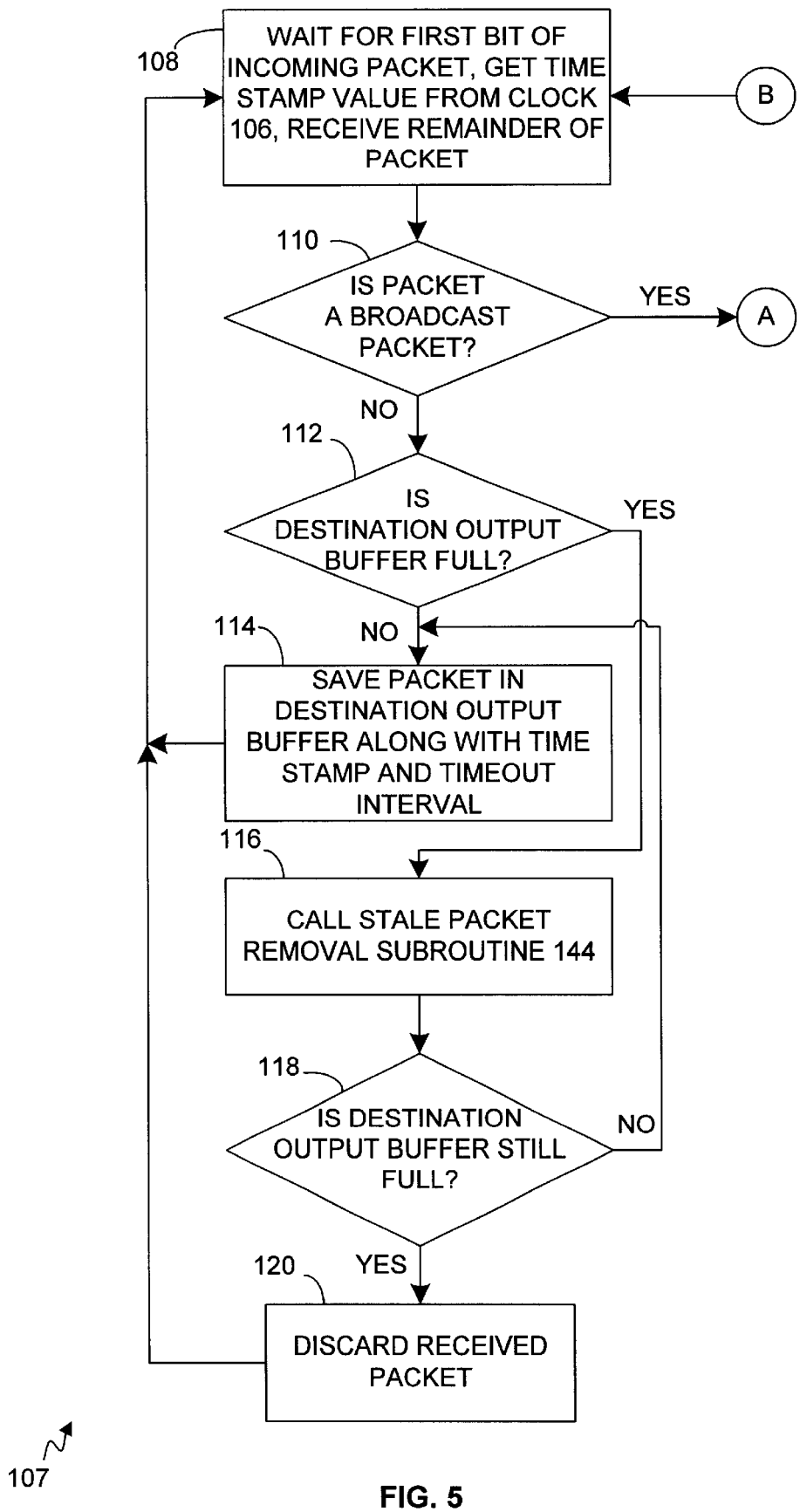
FIGS. 5 and 6, taken together, are a flowchart illustrating how incoming packets are processed by the N port network device of FIG. 4.

FIG. 5 shows flowchart 107, which illustrates how inbound packets are processed by routing unit 100. Block 108 waits for the first bit of an incoming packet. When the first bit of the packet arrives, a time stamp is obtained from clock 106. Block 108 continues to receive packet bits until the packet is assembled. If a complete packet is not received or the packet is corrupted, block 108 waits for the next packet.

Decision block 110 determines whether the packet is a broadcast packet. As discussed above, as used herein the term "broadcast packet" includes multicast packets, or any other type of packet to be transmitted to more than one destination. If it is a broadcast packet, control is passed to decision block 124 of FIG. 6 via label A. If not, control is passed to decision block 112. Decision block 112 determines whether the destination output buffer is full. Note that the destination port (and therefore the destination output buffer) are determined when forwarding unit 100 processes the packet address, as is known in the art. If the output buffer is full, control is passed to block 116, which calls stale packet removal subroutine 144. If the output buffer is not full, control is passed to block 114, which saves the packet in the destination output buffer along with the time stamp retrieved at block 108 and a timeout interval. Selection of the active timeout interval will be described in greater detail below.

Figure 7:
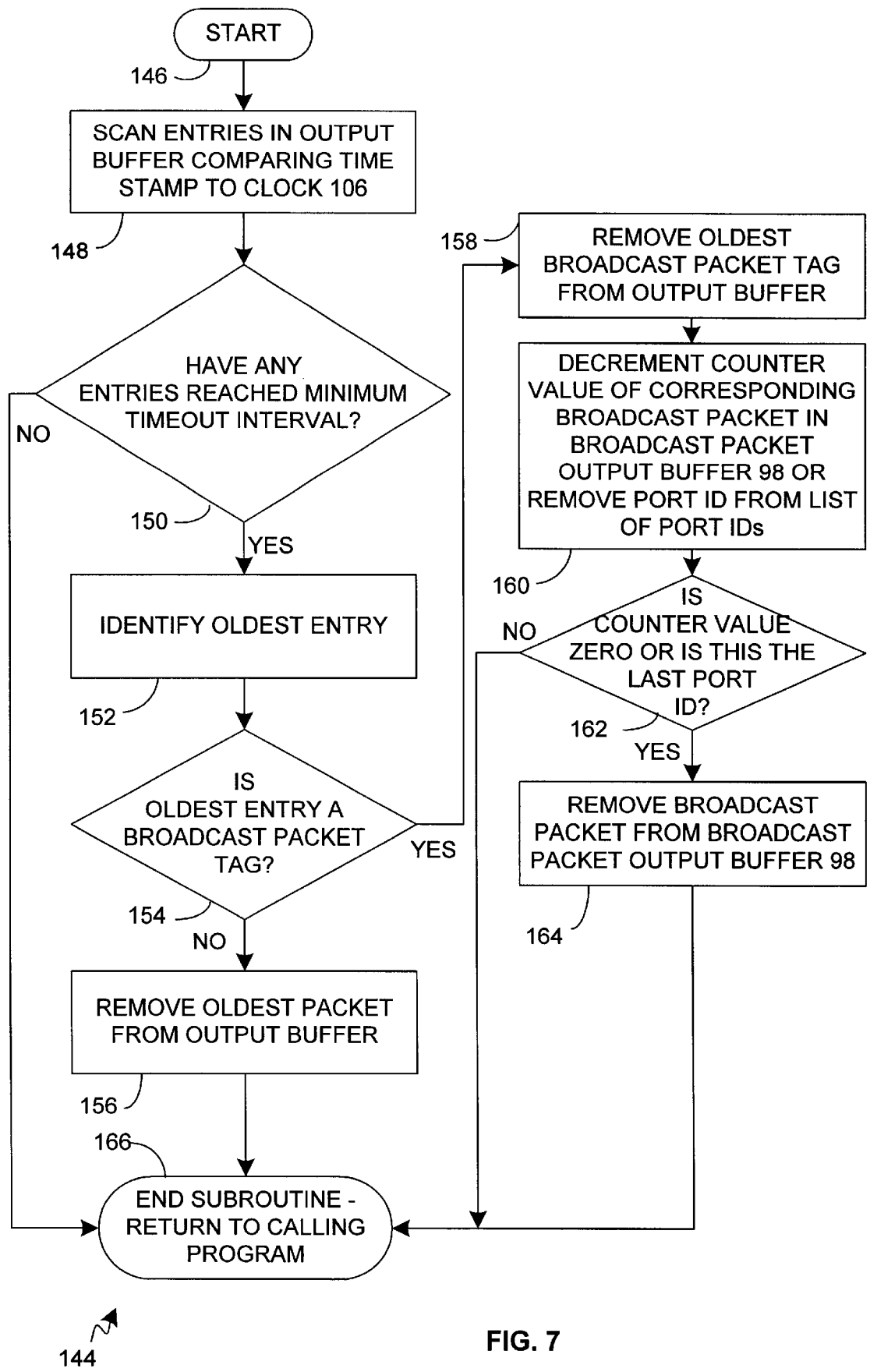
FIGS. 7 and 8 are flowcharts illustrating subroutines that remove stale packets.

A flow chart of stale packet removal subroutine 144 (which was called at block 116) is shown in FIG. 7. The routine starts at block 146, which passes control to block 148. Block 148 scans the entries in the full output buffer and compares the time stamps to clock 106. Decision block 150 determines if any entries have exceeded the minimum timeout interval. Note that the minimum timeout interval may be chosen by a network administrator. If the minimum timeout interval is zero, an entry will always be removed to make room for the arriving packet. If no entries have exceeded the minimum timeout interval, control passes back to the calling program via block 166. If an entry has exceeded the minimum timeout interval, control passes to block 152, which identifies the oldest entry.

Control then passes to decision block 154, which determines whether the oldest entry is a broadcast packet tag. If not, control passes to block 156, which removes the oldest packet from the output buffer. Control then passes to block 166, which returns control to the calling program. If the oldest entry is a broadcast packet tag, control passes from decision block 154 to block 158, which removes the oldest broadcast packet tag from the output buffer. Control then passes to block 160, which decrements the counter value of the corresponding broadcast packet in broadcast packet output buffer 98 or removes from the list of port IDs the port ID associated with the output buffer from which the broadcast tag has been removed. As discussed above, a counter may be associated with a broadcast packet stored in broadcast packet output buffer 98, or alternatively, a list of port IDs may be associated with the broadcast packet.

Next, decision block 162 determines if the counter value is zero or if the last port ID has been removed. In other words, block 162 determines whether all broadcast packets have been processed for all ports. If all packets have not been processed, control passes to block 166 and back to the calling program. If all packets have been processed, then the broadcast packet has been processed at all ports and block 164 removes the broadcast packet from broadcast packet output buffer 98. Control then passes to block 166 and back to the calling program.

Returning to block 116 in FIG. 5, control passes to decision block 118, which determines whether the destination output buffer is still full. Note that the destination output buffer will still be full if no packets have reached the minimum timeout value. If the output buffer is no longer full, control passes to block 114 and the packet is processed as described above. If the buffer is still full, control passes to block 120, the packet is discarded, and control passes to block 108 to wait for the next packet.

Figure 6:
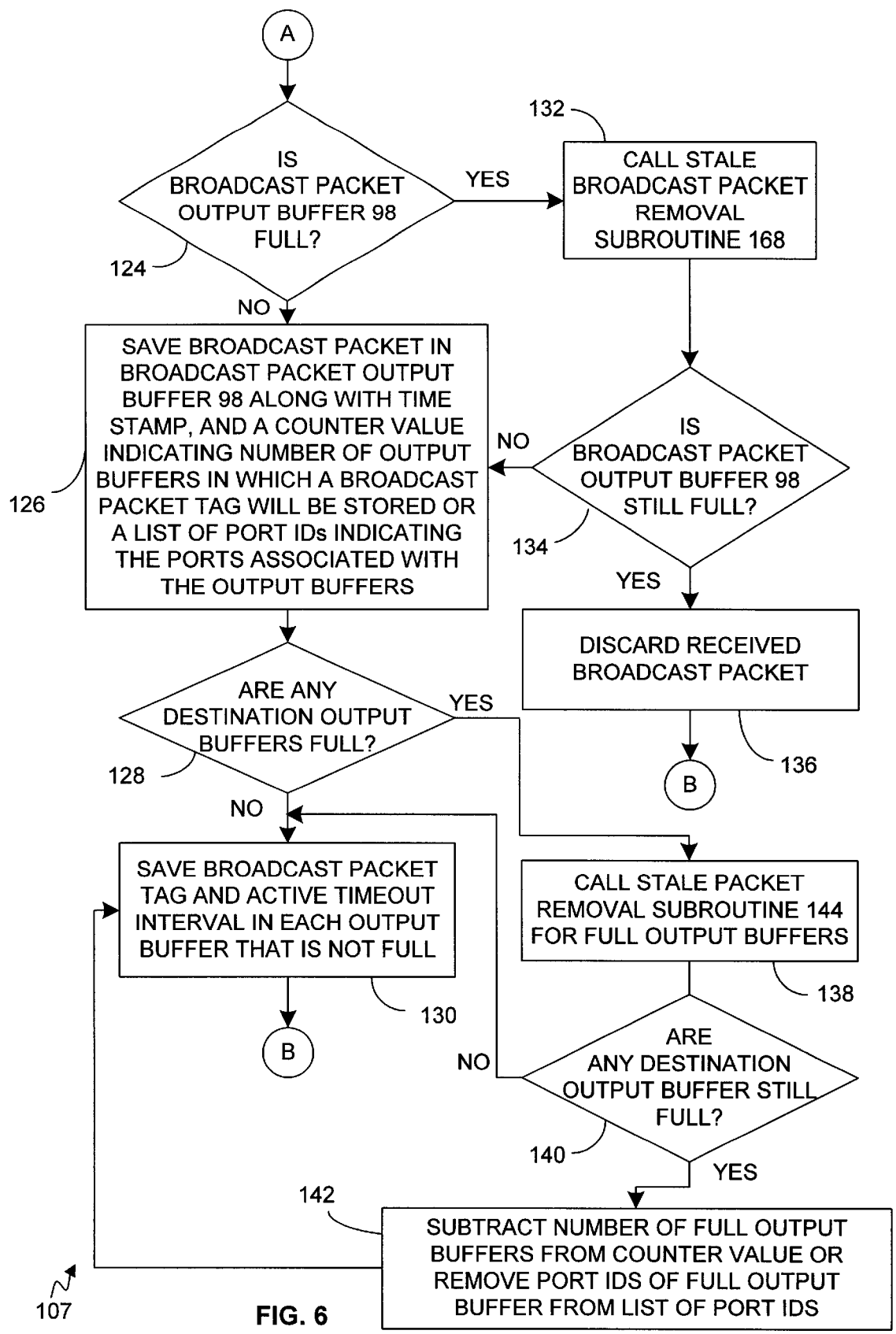

Returning to decision block 110 in FIG. 5, if the incoming packet is a broadcast packet, control passes to decision block 124 in FIG. 6 via label A. Block 124 determines whether broadcast packet output buffer 98 is full. If it is not, control passes to block 126, which saves the broadcast packet in broadcast packet output buffer 98 along with the time stamp obtained at block 108, and a counter value indicating the number of output buffers in which a broadcast packet tag will be stored or a list of port IDs indicating the ports associated with the output buffers at which an attempt will be made to transmit the broadcast packet. Control then passes to decision block 128, which determines whether any of the destination output buffers that must receive a broadcast packet tag are full. If none of the buffers are full, control passes to block 130, which saves a broadcast packet tag and active timeout interval in each output buffer. Control then passes back to block 108 of FIG. 5 via label B.

If any of the destination output buffers are full, control passes to block 138, which calls stale packet removal subroutine 144 for each full output buffer. Subroutine 144 is described above. Next, decision block 140 determines if any of the destination output buffers are still full. If not, control passes to block 130 and broadcast packet tags are saved as described above. If some of the buffers are still full, block 142 subtracts the number of full output buffers from the counter value, or removes from the list of port IDs the port IDs of full output buffers, to indicate that full buffers are not receiving a broadcast packet tag. Control then passes to block 130 to save the broadcast packet tag as described above, and then to block 108 of FIG. 5 via label B. Note that block 130 only saves a tag in output buffers that are not full.

Returning to decision block 124, if broadcast output buffer 98 is full, control passes to block 132, which calls stale broadcast packet removal subroutine 168. Subroutine 168 will be described in greater detail below. Next, decision block 134 determines whether broadcast packet output buffer 98 is still full. If it is, block 136 discards the broadcast packet and control passes back to block 108 of FIG. 5 via label B. If buffer 98 is not full, control passes to block 126, and the broadcast packet is processed as described above.

Figure 8:
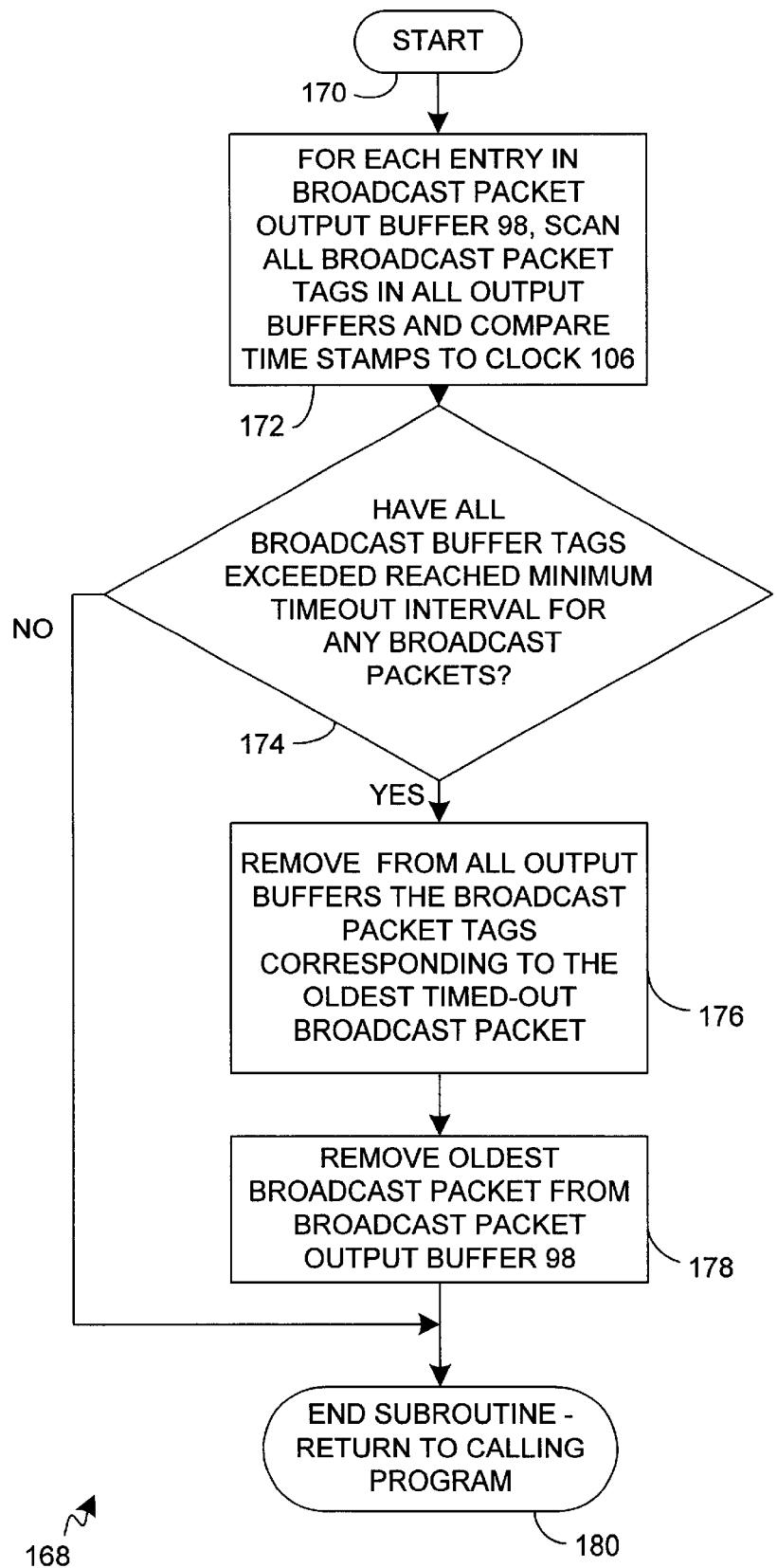

FIG. 8 is a flow chart that shows stale broadcast packet removal subroutine 168. Subroutine 168 starts at block 170, which passes control to block 172. Block 172 examines each entry in broadcast packet output buffer 98, and for each entry scans all broadcast packet tags in all output buffers and compares the time stamps to clock 106. Control then passes to decision block 174, which determines whether all broadcast buffer tags have exceeded the minimum timeout interval for any of the broadcast packets. If not, control passes to block 180, which returns control to the calling program. If all the tags corresponding to any broadcast packets have exceeded the minimum timeout interval, control passes to block 176, which removes from the output buffers the broadcast packet tags corresponding to the oldest broadcast packet. Next, block 178 removes the oldest broadcast packet from broadcast packet output buffer 98. Control then passes to block 180, which returns control to the calling program.

Figure 9:
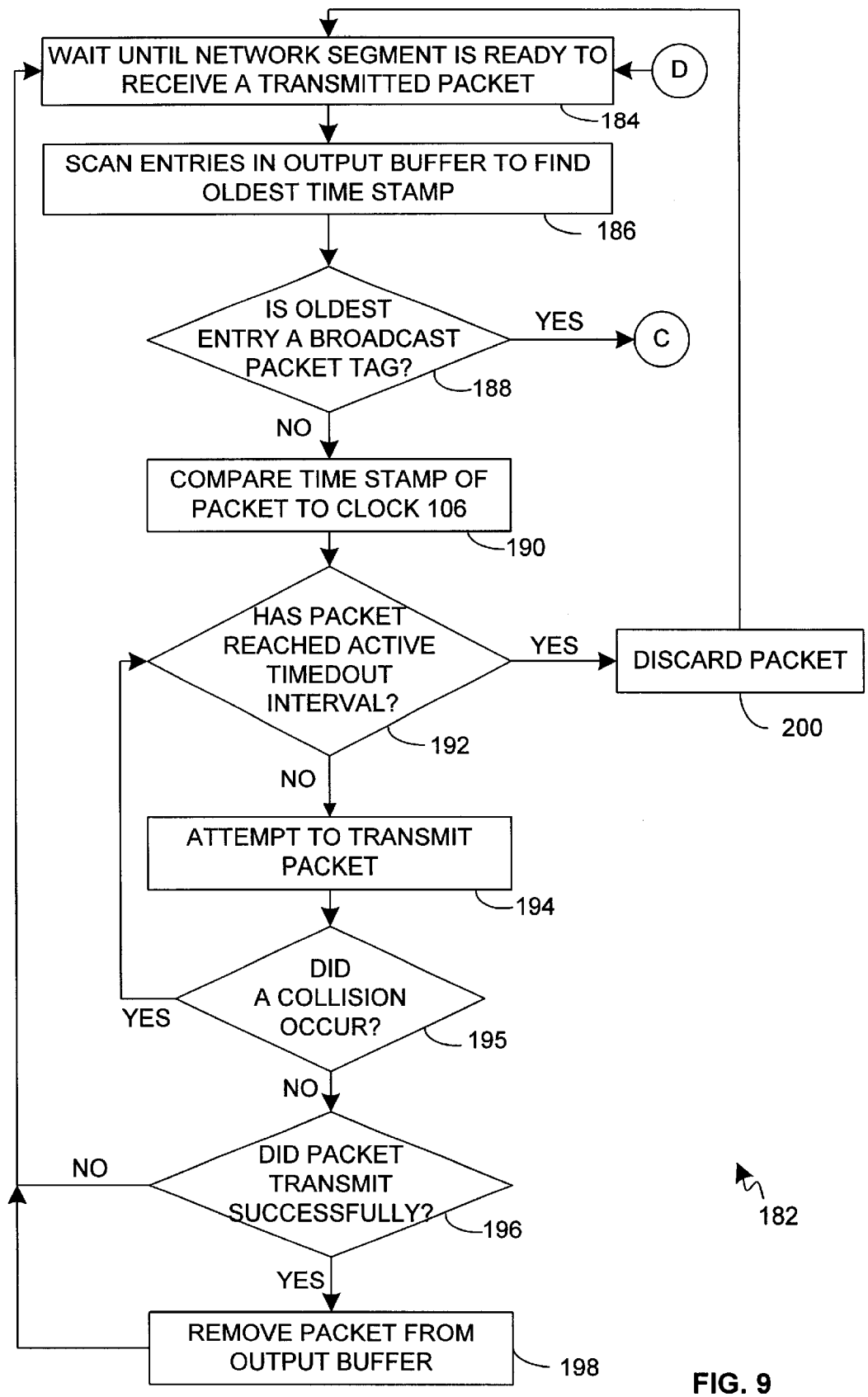
FIGS. 9 and 10, taken together, are a flowchart illustrating how outbound packets are processed by the N port network device of FIG. 4.
Figure 10:
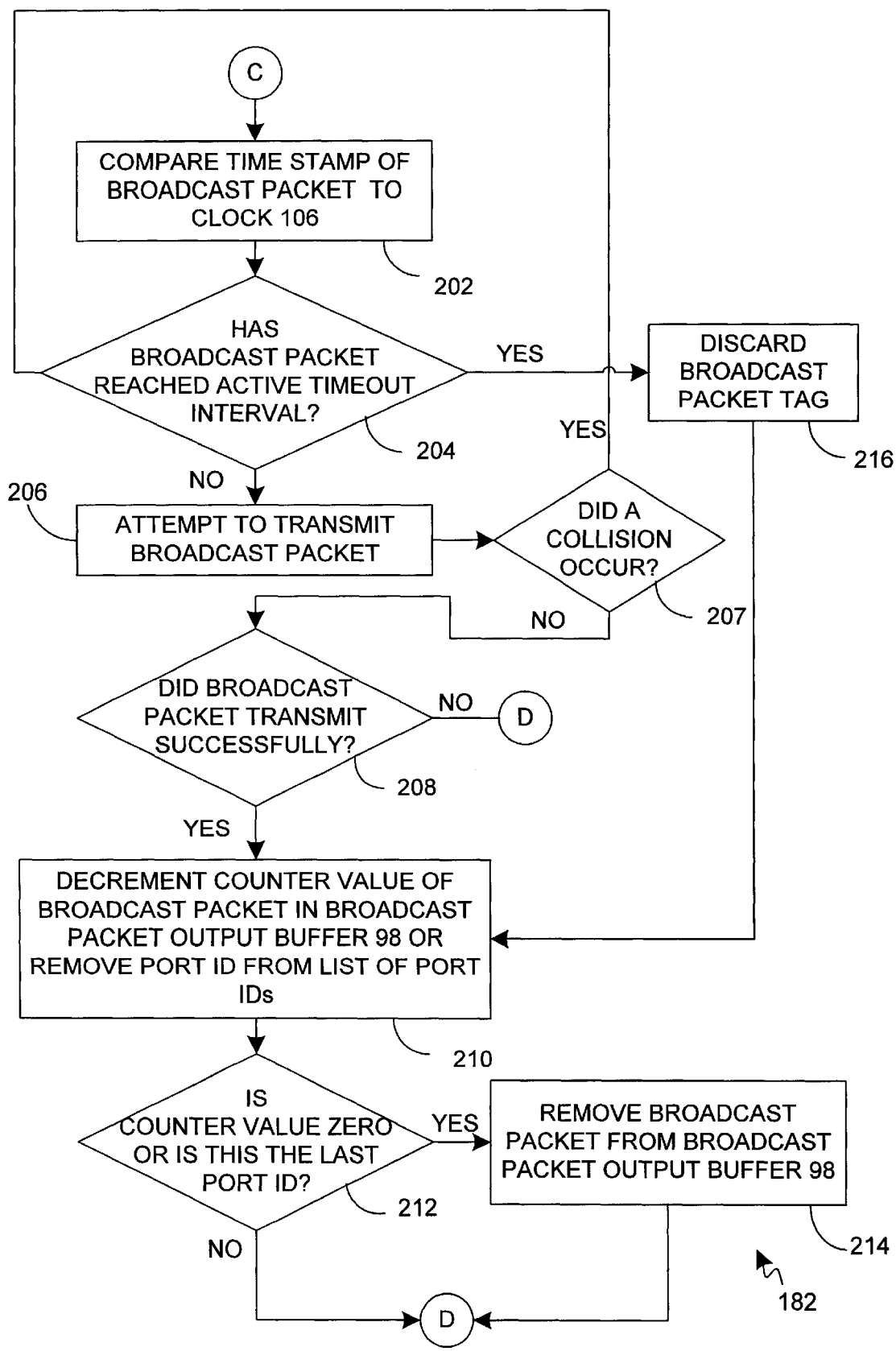

FIGS. 5–8 illustrate how incoming packets are processed by forwarding unit 100 of FIG. 4. Similarly, FIGS. 9–10 show a flow chart 182 illustrating how outgoing packets are processed by output control unit 96. The algorithm shown in flow chart 182 is executed for each port. Block 184 waits until the LAN segment connected to the port is ready to receive a packet. When the segment is ready, control passes to block 186, which scans the entries in the output buffer to find the oldest time stamp. Control then passes to decision block 188, which determines whether the oldest entry stores a broadcast packet tag. If it is, control passes to block 202 in FIG. 10 via label C. If it is not, control passes to block 190, which compares the time stamp of the packet to clock 106. Next, decision block 192 determines whether the packet has reached the active timeout interval. If it has, the packet is discarded at block 200 and control passes back to block 184 to wait to transmit the next packet. If the packet has not timed out, control passes to block 194, which attempts to transmit the packet. Next, decision block 195 detects whether a collision occurred. If it has, control passes back to decision block 192 to determine whether the packet has yet reached the active timeout interval. Note that the present invention allows the retransmission algorithm provided by Ethernet networks to be aborted if a packet reaches the active timeout interval during retransmission attempts. If a collision has not occurred, control passes to decision block 196 to determine if the packet was successfully transmitted.

If it was, block 198 removes the packet from the output buffer and control passes back to block 184 to wait to transmit the next packet.

Returning to decision block 188 in FIG. 9, if the oldest entry is a broadcast packet tag, control passes to block 202 in FIG. 10 via label C. Block 202 compares the time stamp of the broadcast packet to clock 106. Decision block 204 then determines whether the broadcast packet tag has reached the active timeout interval. If it has not, block 206 retrieves the packet from broadcast packet output buffer 98 and attempts to transmit the packet. Decision block 207 determines if a collision has occurred, and if one has, control passes back to decision block 204 to see if the broadcast packet has reached the active timeout interval. If a collision has not occurred, control passes to decision block 208, which determines whether the broadcast packet was transmitted successfully. If it was not, control passes back to block 184 in FIG. 9 via label D to wait to transmit the next packet. If the broadcast packet was successfully transmitted, control passes to block 210.

Block 210 decrements the counter value of the broadcast packet in broadcast packet output buffer 98, or alternatively, removes the port ID from the list of port IDs. Next, decision block 212 determines whether the counter value associated with the broadcast packet is zero or if the last port ID has been removed, thereby determining whether the broadcast packet has been processed at all output buffers. If it has, block 214 removes the broadcast packet from broadcast packet output buffer 98. Thereafter, control passes back to block 184 in FIG. 9 via label D to wait to transmit the next packet. If the counter value is non-zero or port IDs remain, control passes directly back to block 184 in FIG. 9 via label D.

In the embodiment described above, an active timeout interval may be defined for each data packet at each port. Alternatively, if the timeout interval associated with a broadcast or multicast packet is the same for each port, the timeout interval for broadcast or multicast packets could be stored in broadcast packet output buffer 98, instead of being stored in each output buffer along with each tag.

In another embodiment, the active timeout interval may be associated with all packets at each port. In this embodiment, the active timeout interval need not be stored with every entry in the output buffers, since a single active timeout interval would be applied to all packets.

Of course, in another embodiment a timeout interval may be assigned to each port, which would also eliminate the need to store timeout intervals in the output buffers. This could be useful if a downstream network device connected to one of the ports was configured to collect latency and timeout statistics. The port connected to the downstream network device could be configured to not enforce an active timeout interval, while the other ports would continue to discard packets that had timed out.

In accordance with the present invention, the active timeout interval may be varied based on the level of network traffic, thereby conserving network bandwidth when network traffic becomes heavy. For bridges adhering to ANSI/IEEE Standard 802.1D, the active timeout interval shall not exceed 4.0 seconds.

When network traffic is light, and retransmission attempts will not cause network traffic to approach the limit of network bandwidth, the active timeout interval may be set to a maximum time out interval (i.e., 4.0 seconds for IEEE 802.1D bridges). As network traffic increases and the limits of network bandwidth are approached, the active timeout interval may be decreased down to the minimum timeout interval discussed above. For example, a network administrator may configure the maximum timeout interval to be 4.0 seconds and the minimum timeout interval to be 0.25 seconds, and the active timeout interval will be automatically varied between the minimum and maximum timeout intervals based on the level of network traffic. Note that network traffic may be measured using techniques known in the art. In addition, since the present invention supports assigning active timeout intervals on a per port and per packet basis, the active timeout interval may be adjusted based on the network activity present at certain LAN segments, or may be based on the content and or protocol contained in a packet. For example, it may be desirable to identify packets that are part of a video data stream, and set the active timeout interval to a low value for these packets.

Statistics unit 104 can be configured to collect a variety of statistics, such as the average latency, mean latency, and standard deviation of the latency of packets processed by the network device. Such statistics may be collected for each port and can be correlated with the protocols used and the destination addresses of packets. To collect such statistics, the algorithms described above may be modified to note the latency of each packet as it is transmitted based on the time stamp associated with the packet. In addition, statistics unit 104 can be configured to record network traffic levels, dropped packets, or any other information desired by a user of the present invention. Accordingly, the present invention provides a powerful network analysis tool.

The present invention uses buffer memory more efficiently than prior art network devices. Each outgoing broadcast packet is stored only once in a common broadcast packet output buffer, instead of storing a copy of each broadcast packet in the output buffer associated with each port. In addition, when an output buffer is full, the present invention can scan the output buffer and discard stale packets, thereby allowing an incoming packet to be stored in the output buffer. In the prior art, if a packet buffer was full, the incoming packet was simply discarded.

Perhaps the best feature of the present invention is that when network bandwidth is at a premium, the present invention minimizes what would otherwise be a large increase in network traffic. As discussed above, when networks become busy, packets often timeout and upper layers of protocol stacks attempt to retransmit the same data. This causes the network to be flooded with stale packets that will either be ignored or are redundant. The present invention reduces the flood of packets by becoming increasingly more aggressive at discarding stale packets as network traffic levels increase.

Although the present invention has been described with reference to preferred embodiments, workers skilled in the art will recognize that changes may be made in form and detail without departing from the spirit and scope of the invention.

What is claimed is:

1. A network device that receives a packet at one network segment and transmits the packet at another network segment comprising:

a first port at which the packet is received;

a second port at which transmission of the packet will be attempted;

an output buffer associated with and coupled to the second port;

a time stamp unit having a clock;

a forwarding unit coupled to the first port, the time stamp unit, and the output buffer, wherein:

the forwarding unit receives the packet at the first port and stores the packet in the output buffer along with a time stamp obtained from the time stamp unit; and the forwarding unit maintains an active timeout interval that varies with network traffic levels; and an output control unit coupled to the output buffer, wherein:

the output control unit discards any packets that have exceeded the active timeout interval; and the output control unit attempts to transmit at the second port packets that have not exceeded the active timeout interval.

2. The network device of claim 1 and further comprising:

one or more additional ports;

an output buffer associated with each of the additional ports; and a broadcast packet output buffer;

wherein the forwarding unit:

receives a packet addressed to more than one network node at the first port;

stores a broadcast packet tag in each output buffer associated with each port through which transmission of the packet addressed to more than one network node will be attempted;

stores the packet addressed to more than one network node in the broadcast packet output buffer along with a time stamp obtained from the time stamp unit and an indication of the number of output buffers in which a broadcast packet tag was stored; and wherein the output control unit:

removes any broadcast packet tags from the output buffer that have exceeded the active timeout interval;

transmits packets addressed to more than one network node at ports associated with buffers in which a broadcast packet tag was stored if the broadcast packet tag associated with the packet addressed to more than one network node has not exceeded the active timeout interval, with the broadcast tag being removed from an output buffer when transmission occurs at that buffer;

decrements the indication of the number of output buffers when a broadcast packet tag is removed from an output buffer; and removes a packet addressed to more than one network node from the broadcast packet output buffer when the indication of the number of output buffers indicates that all broadcast packet tags associated with the packets addressed to more than one network node have been removed from all output buffers.

3. The network device of claim 2 wherein the indication of the number of output buffers is a counter.

4. The network device of claim 2 wherein the indication of the number of output buffers is a list of port IDs representing the ports associated with the output buffers in which a broadcast buffer tag is stored.

5. A network device that receives a packet at one network segment and transmits the packet at another network segment comprising:

a first port at which the packet is received;

a second port at which transmission of the packet will be attempted;

an output buffer associated with and coupled to the second port;

one or more additional ports;

an output buffer associated with each of the additional ports;

a packet broadcast output buffer;

a time stamp unit having a clock;

a forwarding unit coupled to the first port, the time stamp unit, and the output buffer, wherein:

the forwarding unit receives the packet at the first port and stores the packet as an entry in the output buffer along with a time stamp obtained from the time stamp unit if the output buffer is not full;

the forwarding unit scans the output buffer to identify one or more old entries that have exceeded a minimum timeout interval, discards one or more old entries that have exceed the minimum timeout interval, and stores the packet as an entry in the output buffer along with a time stamp obtained from the time stamp unit if the output buffer is full;

the forwarding unit stores a broadcast packet tag as an entry in each output buffer that is not full and is associated with each port to which transmission of the packet addressed to more than one network node will be attempted;

the forwarding unit scans each output buffer that is full and is associated with each port to which transmission of the packet addressed to more than one network node will be attempted to identify and discard one or more old entries from each output buffer that have exceeded the minimum timeout interval and stores a broadcast packet tag as an entry in each output buffer in which one or more old tags have been removed;

the forwarding unit stores the packet addressed to more than one network node in the broadcast packet output buffer along with a time stamp obtained from the time stamp unit and an indication of the number of output buffers in which a broadcast packet tag was stored if the broadcast packet output buffer is not full; and the forwarding unit scans the broadcast packet output buffer to remove from the broadcast packet output buffer one or more old packets addressed to more than one network node that have exceeded the minimum timeout interval and remove from all output buffers entries holding broadcast packet tags corresponding to old packets addressed to more than one network node that were removed, and stores the packet addressed to more than one network node in the broadcast packet output buffer along with a time stamp obtained from the time stamp unit and an indication of the number of output buffers in which a broadcast packet tag was stored if the broadcast packet output buffer is full; and an output control unit coupled to the output buffer, wherein:

the output control unit discards any entries that have exceeded an active timeout interval;

the output control unit attempts to transmit at the second port packets associated with entries that have not exceeded the active timeout interval, wherein the active timeout interval is greater than the minimum timeout interval;

the output control unit removes any entries from the output buffer that have exceeded the active timeout interval;

the output control unit transmits packets addressed to more than one network node at ports associated with buffers in which a broadcast packet tag was stored as an entry if the packet addressed to more than one network node has not exceeded the active timeout interval, with the entry holding a broadcast packet tag being removed from an output buffer when transmission is attempted at that output buffer;

the output control unit decrements the indication of the number of output buffers when an entry holding a broadcast packet tag is removed from an output buffer; and the output control unit removes a packet addressed to more than one network node from the broadcast packet output buffer when the indication of the number of output buffers indicates that all packet tags associated with the packet addressed to more than one network node have been removed from all output buffers.

6. The network device of claim 5 wherein the indication of the number of output buffers is a counter.

7. The network device of claim 5 wherein the indication of the number of output buffers is a list of port IDs representing the ports associated with the output buffers in which a broadcast buffer tag is stored.

8. A method of processing packets at a network device comprising:

receiving a packet at a first port;

storing the packet in an output buffer associated with a second port along with a time stamp obtained from a time stamp unit having a clock;

adjusting an active timeout interval based on network traffic levels;

discarding the packet based on the time stamp if the packet has exceeded the active timeout interval; and transmitting the packet if the packet has not exceeded the active timeout interval.

9. The method of claim 8 wherein the active time out interval is stored with the packet in the output buffer.

10. The method of claim 8 and further comprising:

receiving a packet addressed to more than one network node at the first port;

storing a broadcast packet tag in each output buffer associated with each port to which transmission of the packet addressed to more than one network node will be attempted;

storing the packet addressed to more than one network node in a broadcast packet output buffer along with a time stamp obtained from the time stamp unit and an indication of the number of output buffers in which a broadcast packet tag was stored;

removing from each output buffer any broadcast tags that have exceeded the active timeout interval;

transmitting at each port packets addressed to more than one network node associated with the broadcast packet tags stored in each port if the packet addressed to more than one network node has not exceeded the timeout interval;

removing from each output buffer broadcast tags associated with packets addressed to more than one network node that have been transmitted;

decrementing the indication of the number output buffers when a broadcast packet tag is removed from an output buffer; and removing a packet addressed to more than one network node from the broadcast packet output buffer when the indication of the number of output buffers indicates that all broadcast packet tags associated with the packet addressed to more than one network node have been removed from all output buffers.

11. The method of claim 10 wherein the indication of the number of output buffers comprises a counter and decrementing the indication of the number output buffers when a broadcast packet tag is removed from an output buffer comprises decrementing the counter.

12. The method of claim 10 wherein the indication of the number of output buffers comprises a list of port IDs representing the ports associated with the output buffers in which a broadcast buffer tag is stored, and decrementing the indication of the number output buffers when a broadcast packet tag is removed from an output buffer comprises removing from the list of port IDs a port ID associated with a port at which transmission of the packet addressed to more than one network node has occurred.

13. A method of processing packets at a network device comprising:

receiving a packet at a first port;

scanning the output buffer to identify one or more entries holding old packets that have exceeded a minimum timeout interval and removing one or more old entries if the output buffer is full;

storing the packet as an entry in an output buffer associated with a second port along with a time stamp obtained from a time stamp unit having a clock if the output buffer is not full;

discarding the entry based on the time stamp if the packet stored in the entry has exceeded an active timeout interval, wherein the active timeout interval is greater than the minimum timeout interval;

transmitting the packet if the packet has not exceeded the active timeout interval receiving a packet addressed to more than one network node at the first port;

scanning each full output buffer to identify and remove one or more old entries holding packets or broadcast packet tags that have exceeded a minimum timeout interval and decrementing an indication of the number of output buffers of each packet addressed to more than one network node stored in a broadcast packet output buffer and associated with a broadcast packet tag that was removed;

storing a broadcast packet tag as an entry in each output buffer associated with each port to which transmission of the packet addressed to more than one network node will be attempted;

scanning a broadcast packet output buffer if the broadcast output buffer is full to identify and remove one or more old packets addressed to more than one network node that have exceeded a minimum time out interval, and removing from all output buffers entries holding broadcast packet tags associated with all old removed packets addressed to more than one network node;

storing the packet addressed to more than one network node in a broadcast packet output buffer along with a time stamp obtained from the time stamp unit and an indication of the number of output buffers in which a broadcast packet tag was stored;

removing from each output buffer entries holding broadcast tags that have exceeded the active timeout interval;

transmitting at each port packets addressed to more than one network node associated with the broadcast packet tags stored as entries in each output buffer if the packet addressed to more than one network node has not exceeded the timeout interval;

removing from each output buffer entries holding broadcast packet tags associated with packets addressed to more than one network node that have been attempted to be transmitted;

decrementing the indication of the number of output buffers when an entry holding a broadcast packet tag is removed from an output buffer; and removing a packet addressed to more than one network node from the broadcast packet output buffer when the indication of the number of output buffers indicates that all entries holding broadcast packet tags associated with the packet addressed to more than one network node have been removed from all output buffers.

14. The method of claim 13 wherein the indication of the number of output buffers comprises a counter, and decrementing the indication of the number output buffers when an entry holding a broadcast packet tag is removed from an output buffer comprises decrementing the counter.

15. The method of claim 13 wherein the indication of the number of output buffers comprises a list of port IDs representing the ports associated with the output buffers in which an entry holding a broadcast buffer tag is stored and decrementing the indication of the number output buffers when a broadcast packet tag is removed from an output buffer comprises removing from the list of port IDs a port ID associated with a port at which transmission of the broadcast packet has occurred.

* * * * *